United States Patent [19]

Kozdon et al.

[11] Patent Number: 5,594,781
[45] Date of Patent: Jan. 14, 1997

[54] MOBILE TELEPHONE CONNECTION TRANSFER

[75] Inventors: Peter J. Kozdon, Santa Clara; Neal J. King, Oakland, both of Calif.

[73] Assignee: Rolm Company, Santa Clara, Calif.

[21] Appl. No.: 627,822

[22] Filed: Apr. 2, 1996

Related U.S. Application Data

[63] Continuation of Ser. No. 280,165, Jul. 25, 1994, abandoned.

[51] Int. Cl.⁶ .................................................. H04Q 7/20
[52] U.S. Cl. ......................... 379/60; 379/58; 379/59; 379/61; 455/33.2
[58] Field of Search ..................... 379/58, 59, 60, 379/61, 63; 455/33.1, 33.2, 54.1

[56] References Cited

U.S. PATENT DOCUMENTS

| | | | |
|---|---|---|---|
| 4,989,230 | 1/1991 | Gillig et al. | 379/59 |
| 5,018,187 | 5/1991 | Marinho et al. | 379/60 |
| 5,260,988 | 11/1993 | Schellinger et al. | 379/59 |
| 5,291,544 | 3/1994 | Hecker | 379/59 X |

OTHER PUBLICATIONS

"System 900: The ISDN Approach to Cellular Mobile Radio", Electrical Communication, Weib et al, vol. 63, No. 4, 1989, pp. 400–408.

*Primary Examiner*—Curtis Kuntz
*Assistant Examiner*—G. J. Oehling

[57] ABSTRACT

A method for transferring an active connection between a mobile telephone handset and a first mobile telephone system to a second mobile telephone system, which includes the steps of detecting that signal strength of the active connection has fallen below a predetermined threshold; sending a request to the first mobile telephone system to set up an alternative connection from the first mobile telephone system to the mobile telephone handset through the second mobile telephone system; and transferring the active connection to the alternate connection.

1 Claim, 2 Drawing Sheets

MOBILE TELEPHONE CONNECTION TRANSFER

CROSS-REFERENCE TO RELATED APPLICATION

This is a continuation of Ser. No. 08/280,165 filed Jul. 25, 1994 (now abandoned).

TECHNICAL FIELD OF THE INVENTION

The present invention relates to a method for transferring an active connection from one mobile telephone system to another mobile telephone system.

BACKGROUND OF THE INVENTION

During a telephone call between a mobile telephone handset and another telephone, the mobile telephone handset may cross from the domain of one wireless network to an independent wireless network. In the absence of a connection transfer procedure, the telephone call will be dropped and communication can be re-established only by making a new telephone call.

In the prior art, handover of a telephone call from the domain of a first wireless network to a domain of a second wireless network is made if a control link is shared between central processing units (for example, switches) of the two networks. Using the control link, the two wireless networks are able to negotiate feasibility and operations of handover, see, for example, EIA/TIA Interim Standard IS-41.2-B, "Cellular Radiotelecommunications Intersystem Operations: Intersystem Handoff."

The above-described approach is disadvantageous in that it requires a control link between central processing units, i.e., switches, of the networks. Although switches supporting adjacent geographical areas may share such a control link, two switches supporting overlapping areas are likely to be owned by competitors and, as a result, will not share a control link. In particular, public Personal Communications Services ("PCS") and private wireless networks will not share such a control link; nor will competing Cellular service providers share such a control link.

In light of the above, there is a need in the art for a method which provides continuation or connection transfer of an ongoing telephone call during a mobile telephone handset's transition from one wireless network to another, for example, connection transfer from a private wireless network (Wireless Private Branch Exchange ("W-PBX")) to a public wireless network (Personal Communications Services ("PCS"), or vice versa.

SUMMARY OF THE INVENTION

Advantageously, embodiments of the present invention are method and apparatus which provide continuation or connection transfer of an ongoing telephone call during the handset's transition from one wireless network to another, for example, connection transfer from a private wireless network (Wireless Private Branch Exchange ("W-PBX")) to the public wireless network (Personal Communications Services ("PCS"), or vice versa.

In particular, an embodiment of the present invention comprises a method for transferring an active connection between a mobile telephone handset and a first mobile telephone system to a second mobile telephone system, which method includes the steps of: (a) detecting that signal strength of the active connection has fallen below a predetermined threshold; (b) sending a request to the first mobile telephone system to set up an alternative connection from the first mobile telephone system to the mobile telephone handset through the second mobile telephone system; and (c) transferring the active connection to the alternate connection.

DETAILED DESCRIPTION

Figure 1:
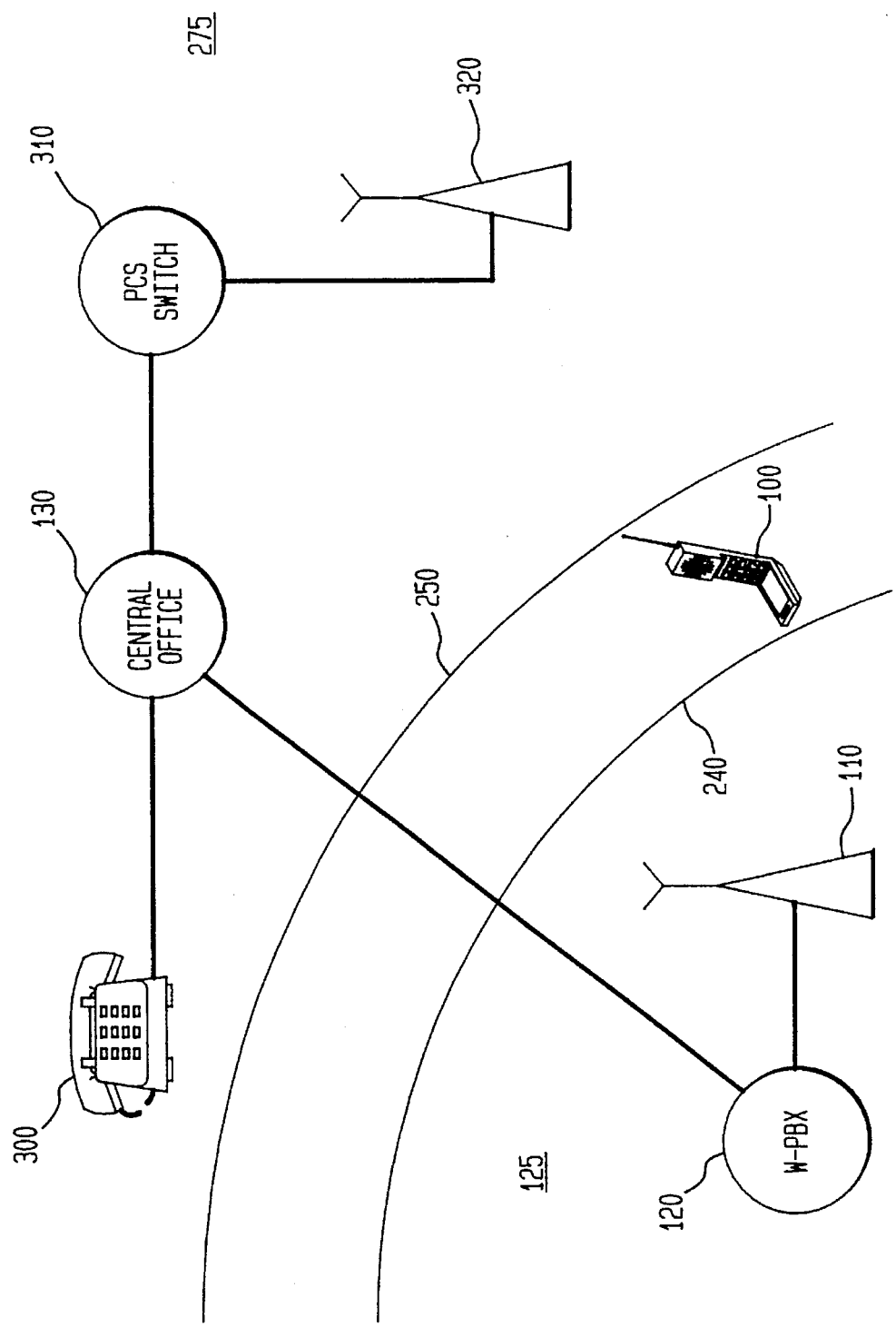
FIG. 1 shows, in pictorial form, a network and the manner of use of embodiments of the present invention.

FIG. 1 shows a network and the manner of use of embodiments of the present invention. As shown in FIG. 1, a caller-user using mobile telephone handset 100 is connected on a telephone call with a called party who uses telephone 300. The connection is made: (a) from mobile telephone handset 100 to antenna 110; (b) from antenna 110 to Wireless Private Branch Exchange 120 ("W-PBX 120") of a private wireless network 125 ("PWN 125"); (c) from W-PBX 120 to telephone central office 130 ("CO 130"); and (d) from CO 130 to telephone 300 over, for example, the public switched telephone network.

As shown in FIG. 1, boundary 250 delineates the outer reach of antenna 110 of PWN 125 for providing good reception for telephone calls made to mobile telephone handsets. Further, boundary 240 represents the beginning of an area where the reception and connectivity of calls made to mobile telephone handsets from antenna 110 will begin to suffer degradation.

In accordance with the present invention, mobile telephone handset 100 can be reached at two telephone numbers. For example, one telephone number is a direct-inward-dial ("DID") telephone number of mobile telephone handset 100 for use in PWN 125 (with respect to W-PBX 120—for example and for sake of illustration, 408-555-3164) and another telephone number is a PCS telephone number for use in public wireless network 275 (Personal Communications Services 275 ("PCS 275") (with respect to PCS switch 310—for example and for sake of illustration, 500 555-1111).

Figure 2:
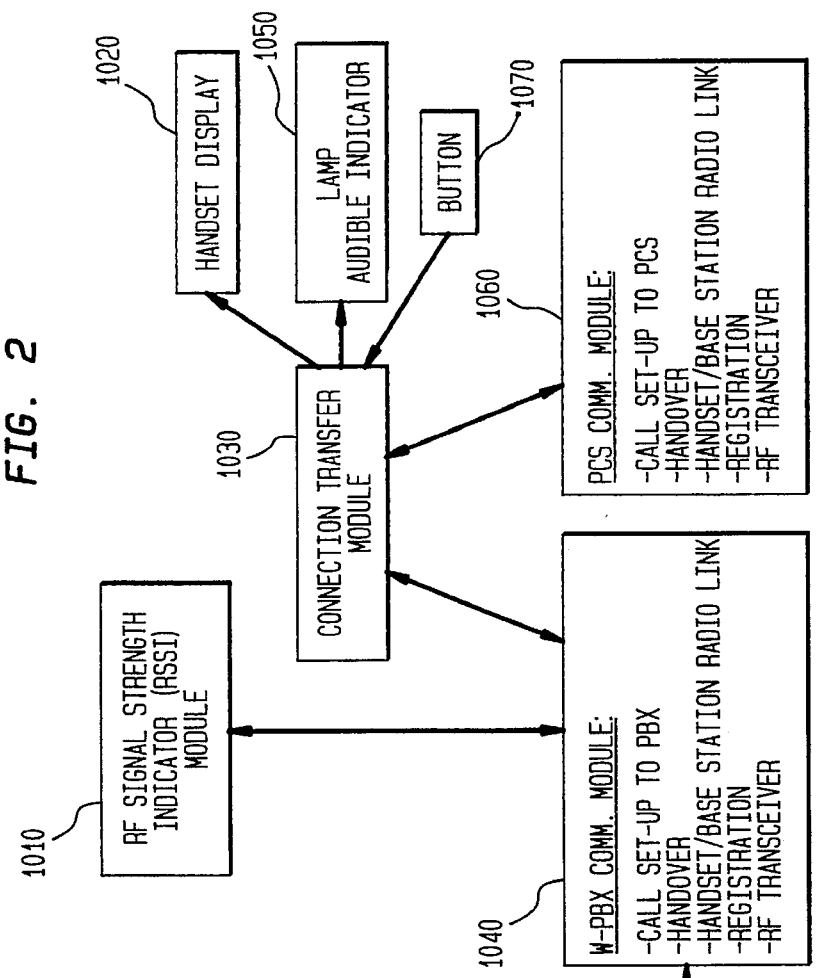
FIG. 2 shows a block diagram of a portion of an embodiment of the present invention which resides in a mobile telephone handset.
Figure 3:
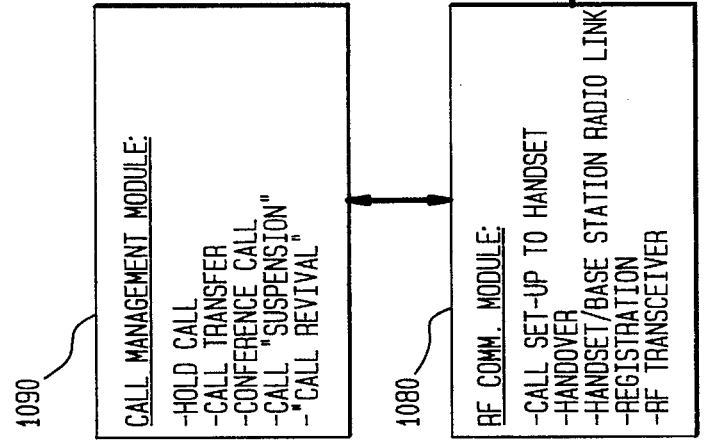
FIG. 3 shows a block diagram of a portion of an embodiment of the present invention which resides in a wireless PBX.

FIG. 2 shows a block diagram of a portion of an embodiment of the present invention which resides in mobile telephone handset 100 and FIG. 3 shows a block diagram of a portion of an embodiment of the present invention which resides in a wireless PBX. In accordance with the present invention, mobile telephone handset 100 comprises RF Signal Strength Indicator Module 1010 (RSSI 1010) for recognizing the need to make a connection transfer of a telephone call from, for example, W-PBX 120, because of signal fade. In particular signal fade would occur when the caller-user has gone past boundary 240 of PWN 125. As is well known, existing mobile telephone handsets which are commercially available incorporate microprocessor functionality to fabricate RSSI 1010 for measuring signal strength and for determining that it is weak, i.e., the signal strength falls below a predetermined threshold. As shown in FIG. 2, RSSI 1010 communicates with W-PBX Communications Module 1040 (WPCM 1040) whenever the signal strength falls below the predetermined threshold to cause WPCM 1040 to attempt to make a handover, i.e., a connection to another antenna of PWN 125 having a suitably strong signal. If WPCM 1040 cannot make a handover, it sends a signal to Connection Transfer Module 1030 (CTM 1030). In response, CTM 1030 sends a signal to PCS Communications Module 1060 (PCM 1060) to attempt to find another system to which it can transfer the connection. PCM 1060 includes apparatus for registering mobile telephone handset 100 as a valid user of PCS 275. Registration refers to a method of verifying that the mobile telephone handset can communicate with a wireless network such as, for example, PCS 275. This is accomplished with respect to PCS 275 by the mobile telephone handset exchanging radio signals with PCS 275 which are designed to establish the handset's status as a valid user of PCS 275. The exchange of such radio signals takes place in accordance with protocols which are well known to those of ordinary skill in the art, see, for example, EIA/TIA Interim Standard "IS-54-B, 'Cellular System Dual-Mode Mobile Station—Base Station Compatibility Standard.'" If the registration is successful, PCM 1060 sends a signal indicating that condition to CTM 1030 and CTM 1030, in turn, sends a signal to Handset Display 1020, and perhaps to Lamp and/or Audible Indicator 1050 to provide an indication to the caller-user of the need for a network-to-network connection transfer.

In response to the indication, the caller-user will recognize: (a) that the best signal that can be provided by the current network (including handovers) is so poor that it may threaten continuation of the call and (b) that mobile telephone handset 100 can communicate with alternate network PCS 275.

Then, the caller-user initiates a connection transfer procedure which is pre-programmed into mobile telephone handset 100 by, for example, pressing a function key, i.e., button 1070, on handset 100. Button 1070 causes a signal to be transferred to CTM 1030. In response, CTM 1030 activates a preprogrammed procedure. As those of ordinary skill in the art will readily appreciate, the indications provided may be timed to provide an interval within which the user may activate the transfer mechanism. In a preferred embodiment of the present invention, CTM 1030 is implemented in a microprocessor. The pre-programmed procedure initiates a Call Transfer of the ongoing telephone call from the current telephone number (408-555-3164) and network (PWN 125) to its other telephone number (500-555-1111) and network (PCS 275). Although this embodiment is described so that a user may initiate the transfer, the present invention is not limited to this method of initiation. In fact, alternative embodiments of the present invention may be fabricated wherein the mobile telephone set automatically initiates the transfer.

The following steps are carried out in performing the inventive connection transtar procedure. CTM 1030 turns off Lamp and/or Audible Indicator 1050. Then, CTM 1030 sends a signal to WPCM 1040 which causes WPCM 1040 to send a Call Transfer message to W-PBX 120 by radio signal. The Call Transfer message is received by RF Communications Module 1080 of W-PBX 120 (RCM 1080) shown in FIG. 3. RCM 1080 transfers the Call Transfer message to Call Management Module 1090 of W-PBX 120 (CMM 1090) shown in FIG. 3. In response, CMM 1090 places the current call on hold and provides dial tone to mobile telephone handset 100. Mobile telephone handset 100 detects the dial tone and transfers that information to CTM 1030. In response, CTM 1030 transfers alternate telephone number (500-555-1111) to WPCM 1040 and WPCM 1040, in turn, transfers the alternate telephone number to RCM 1080. RCM 1080 transfers the alternate telephone number to CMM 1090. In response, CMM 1090 completes a normal-call transfer function by initiating a call to the alternate telephone number over the normal landline telephone network. Mobile telephone set 100 detects alerting, for example, ringing, and transfers that information to CTM 1030. In response, CTM 1030: (a) transfers a signal to WPCM 1040 which causes it to transmit a signal to RCM 1080 which causes W-PBX 120 to hang-up on the original call, and (b) transfers a signal to PCM 1060 to cause it to answer the call to the alternate telephone number.

Thus, the new call connection is made: (a) from mobile telephone handset 100 to antenna 320; (b) from antenna 320 to PCS switch 310; (c) from PCS switch 310 to W-PBX 120; (d) from W-PBX 120 to telephone central office 130 ("CO 130"); and (e) from CO 130 to telephone 300 over, for example, the public switched telephone network. As those of ordinary skill in the art will readily appreciate, the embodiment described above utilizes a capability of any modern switch which is referred to in the art as a "blind" Call Transfer. All of the above-described steps take place in response to the press of a single button by the caller-user. Although this embodiment was described so that CTM 1030 would initiate the hang-up, the present invention is not limited to this methodology. In fact, alternative embodiments of the present invention may be fabricated wherein W-PBX 120 would hang up.

In an alternative embodiment of the present invention, one can utilize a Conference Call procedure in place of the Call Transfer procedure described above. However, this is not a preferred embodiment in that it suffers from one disadvantage. The disadvantage is that the handset must be equipped to transceive on both wireless networks simultaneously, i.e. , it must be able to send and receive radio communication with two different entities at the same time, possibly at different frequencies and with different modulation schemes. This embodiment may be fabricated, in one approach, using two transceivers, one to communicate with one of the wireless networks using a time division multiple access ("TDMA") technology and protocol, and the other using a code division multiple access ("CDMA") technology and protocol. This embodiment may be fabricated, in another approach, using a single TDMA transceiver operating at two widely separated frequency bands, alternating between the two bands within a single TDMA frame. Those of ordinary skill in the art should understand that these alternative embodiments are not limited to these two approaches. In any of these approaches, the procedure for setting up a call to the new network on one communications link must be able to operate while the other communications link is supporting normal conversation to the old network.

The following steps are carried out in performing the alternative procedure. CTM 1030 turns off Lamp and/or Audible Indicator 1050. Then, CTM 1030 sends a signal to WPCM 1040 which causes WPCM 1040 to send a Conference Call message to W-PBX 120 by radio signal. The Conference Call message is received by RCM 1080 and RCM 1080 transfers the Conference Call message to CMM 1090. In response, CMM 1090 places the current call on hold and provides dial tone to mobile telephone handset 100. Mobile telephone handset 100 detects the dial tone and transfers that information to CTM 1030. In response, CTM 1030 transfers alternate telephone number (500-555-1111) to WPCM 1040 and WPCM 1040, in turn, transfers the alternate telephone number to RCM 1080. RCM 1080 transfers the alternate telephone number to CMM 1090. In response, CMM 1090 continues a normal conference call function by initiating a call to the alternate telephone number over the normal landline telephone network. Mobile telephone set 100 detects alerting, for example, ringing, and transfers that information to CTM 1030. In response, CTM 1030: (a) transfers a signal to PCM 1060 to cause it to answer the call to the alternate telephone number; (b) transfers a signal to WPCM 1040 which causes it to transmit a signal to RCM 1080 which causes W-PBX 120 to bridge the calls (this requires simultaneity, i.e., to handle two telephone calls); and (c) transfers a signal to WPCM 1040 which causes it to transmit a signal to RCM 1080 which causes W-PBX 120 to hang-up on the original call. As those of ordinary skill in the art will readily appreciate, simultaneity can be provided by having the two sets of software controlling call set up and conversation, which sets of software run as "time-sharing" applications on the microprocessor. An advantage of this alternative embodiment is that two independent connections are set up simultaneously and, as a result, the telephone call will be more robust against spatial variations in relative signal strength, which variations are characteristic of network boundaries.

Although the present invention has been described as though there is only one alternative network, the present invention is not so limited. In fact, the mobile telephone handset could do a search for an available network from among a group of alternatives and the handset would then signal when one of the alternatives is available. In fact, apparatus within the handset will search sequentially through a selection of frequencies, modulation schemes, and protocols until communication is established with one of the alternative networks. The microprocessor which performs the search does so in a manner which should be clear to those of ordinary skill in the art so that it can be programmed to select from a predetermined list of networks. An extension of this capability would be to have the microprocessor, first, determine which of the listed networks is available for communication, and second, select one of them based on billing rate or other criteria of preference.

In a further embodiment, one may have a connection transfer between competing cellular service providers. For example, this would take place in a portion of a serving area where one of the carrier's signal is very weak but the other is adequate.

As those of ordinary skill in the art can readily appreciate, the above describes how to give a mobile telephone handset a capability of handing a call from a private wireless network to a public wireless network without dropping the call. However, as described above, such a connection transfer necessarily entails usage charges ("air-time" charges) from the public wireless carrier. As has been described above, after the caller-user's transition from the domain of W-PBX 120 to the domain of PCS switch 310, the telephone call is carried by W-PBX 120 and PCS switch 310. This is because, as is shown in FIG. 1 and as was described above, W-PBX 120 receives the telephone call from the public landline network and connects it to a call to PCS 275. If, at this point, mobile telephone handset 100 returns to the domain of private wireless network 125, an iteration of the same connection transfer feature will result in the telephone call being connected to W-PBX 120 twice; once from the originating landline network and once from PCS switch 310. Aside from wasting a trunk to provide such a connection, the continued operation of PCS switch 310 ensures that usage charges will still be incurred by the caller-user.

The following describes a preferred embodiment of the present invention which minimizes the incidence of public usage time. In accordance with the present invention, mobile telephone handset 100 comprises apparatus for recognizing the need to perform a connection transfer of a telephone call from, for example, W-PBX 120, because of signal fade, see the description set forth above. In particular signal fade occurs whenever the caller-user goes past boundary 240 of PWN 125. In addition, the apparatus further comprises apparatus for verifying that it can communicate with PCS 275, see the description set forth above. The apparatus will send a signal to an indicator, for example, a light, a tone generator, or both, to provide an indication to the caller-user of the need for a network-to-network connection transfer, see the description set forth above. In response to the indication, the caller-user will recognize: (a) that the best signal that can be provided by the current network (including internal handovers) is so poor that it may threaten continuation of the call and (b) that mobile telephone handset 100 can communicate with alternate network PCS 275.

Then, the caller-user initiates a connection transfer procedure which is preprogrammed into mobile telephone handset 100, see the description set forth above. This procedure includes the following steps. CTM 1030 turns off Lamp and/or Audible Indicator 1050. Then, CTM 1030 sends a signal to WPCM 1040 which causes WPCM 1040 to send a Conference Call message to W-PBX 120 by radio signal. The Conference Call message is received by RCM 1080 and RCM 1080 transfers the Conference Call message to CMM 1090. In response, CMM 1090 places the current call on hold and provides dial tone to mobile telephone handset 100. Mobile telephone handset 100 detects the dial tone and transfers that information to CTM 1030. In response, CTM 1030 transfers alternate telephone number (500-555-1111) to WPCM 1040 and WPCM 1040, in turn, transfers the alternate telephone number to RCM 1080. RCM 1080 transfers the alternate telephone number to CMM 1090. In response, CMM 1090 continues a normal conference call function by initiating a call to the alternate telephone number over the normal landline telephone network. Mobile telephone set 100 detects alerting, for example, ringing, and transfers that information to CTM 1030. In response, CTM 1030: (a) transfers a signal to PCM 1060 to cause it to answer the call to the alternate telephone number; and (b) transfers a signal to WPCM 1040 which causes it to transmit a signal to RCM 1080 which causes W-PBX 120 to bridge the calls (this requires simultaneity, i.e., to handle two telephone calls). If the caller-user moves out of the range of PWN 125, for example, beyond boundary 250, mobile telephone handset 100 can no longer be reached by W-PBX 120. This is detected by RCM 1080 and a message is sent to CMM 1090. In response, CMM 1090 does not drop the call. Instead, the call is "suspended." This means that W-PBX 120 maintains mobile telephone handset 120 with telephone number 408-555-3164 as a valid, but inactive, member of the conference, but W-PBX 120 uses no radio resources to maintain the call. W-PBX 120 thus maintains the status of telephone number 408-555-3164 of mobile telephone handset 100 with respect to W-PBX 120 as a continuing member of the Conference Call. Those of ordinary skill in the art will readily appreciate that this "suspended" status is analogous to W-PBX 120 putting mobile telephone handset 100 on "Silent Hold." Silent Hold refers to a condition where no audible indication is given to the other parties. As is well known to those of ordinary skill in the art, this feature of providing Silent Hold is an existing feature of some commercially available PBXs. Then, in accordance with the present invention, W-PBX 120 maintains the Conference Call until either party hangs up. There are two cases to consider. In the first case, the call terminates before mobile telephone set 100 returns to the domain of PWN 125. For this case, CMM 1090 deletes the Conference Call and marks mobile telephone handset 100 as being available for receiving incoming calls. In the second case, both parties have not hung up when the caller-user returns to the domain of PWN 125. For this case, WPCM 1040 recognizes that mobile telephone handset 100 has entered the domain of PWN 125. WPCM 1040 sends a message to CTM 1030 informing it of this fact. In response, CTM 1030 sends a signal to Handset Display 1020, and perhaps to Lamp and/or Audible Indicator 1050 to provide an indication to the caller-user of the possibility of reconnecting to W-PBX 120. The caller-user initiates connection transfer back to W-PBX 120 by pressing button 1070, on handset 100. Button 1070 causes a signal to be transferred to CTM 1030. In response, CTM 1030 turns off Lamp and/or Audible Indicator 1050. Then, CTM 1030 sends a signal to WPCM 1040 which causes WPCM 1040 to send a "Re-join Conference Call" message to W-PBX 120 by radio signal. The "Re-join Conference Call" message is received by RCM 1080. RCM 1080 transfers the "Re-join Conference Call" message to CMM 1090. In response, CMM 1090 revives the original call as an active member of the conference call. Finally, CTM 1030 sends a hang-up message to PCM 1060 and PCM 1060, in turn, relays this message to PCS 275. Thus, W-PBX 120 has been re-connected with mobile telephone handset 100 and the call to PCS switch 310 has been dropped. As one can readily appreciate, after the above, only one telephone call is up, i.e., the telephone call from W-PBX 120 to mobile telephone handset 100.

In an alternative embodiment of the present invention, the inventive method may be applied in situations where mobile telephone handset 100 has multiple transceivers. In such a case, mobile telephone 100 will attempt to register with various networks. However, one would use a different telephone number for each network.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. In particular, although embodiments of the present invention were described in light of a personal communications services network, it should be understood that the present invention is not restricted to this type of network and includes the use of other networks such as, for example, mobile cellular networks. Further, although embodiments of the present invention were described in the context of a voice telephone call, it should be understood that the present invention is not restricted to this type of a call and applies to data calls as well.

What is claimed is:

1. Method for transferring an active connection between a mobile telephone handset and a first mobile telephone system to a second mobile telephone system, the mobile telephone handset being addressed by a first telephone number in the first mobile telephone system and a second telephone number in the second mobile telephone system, a telephone connected to the second mobile telephone system being connected to the mobile telephone handset when the telephone dials the second telephone number, which method comprises the steps of:

detecting that a signal strength of the active connection has fallen below a predetermined threshold;

sending a request from the mobile telephone handset to the first mobile telephone system to set up an alternative connection from the first mobile telephone system to the mobile telephone handset through the second mobile telephone system, wherein the step of sending a request comprises the step of receiving user input to initiate the sending; and causing the first mobile telephone system to connect to the second mobile telephone system via the alternate connection by causing the first mobile telephone system to place a call to the mobile telephone handset through the second mobile telephone system by dialing the second telephone number on a telephone circuit connecting the first mobile telephone system to the second mobile telephone system, wherein the step of connecting comprises the step of requesting said first mobile telephone system to set up a conference call involving the mobile telephone handset using the second telephone number which is provided by the mobile telephone handset, and wherein the step of connecting further comprises the step of detecting whether the signal strength falls below a further predetermined threshold and, if so, suspending the active connection to create an inactive party to the conference call.

* * * * *